United States Patent
Bennati et al.

(10) Patent No.: US 11,703,337 B2
(45) Date of Patent: Jul. 18, 2023

(54) METHOD, APPARATUS, AND COMPUTER PROGRAM PRODUCT FOR ANONYMIZING TRAJECTORIES

(71) Applicant: HERE Global B.V., Eindhoven (NL)

(72) Inventors: Stefano Bennati, Zurich (SZ); Aleksandra Kovacevic, Wettswil (SZ); Elena Vidyakina, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 197 days.

(21) Appl. No.: 17/118,272

(22) Filed: Dec. 10, 2020

(65) Prior Publication Data

US 2022/0026225 A1  Jan. 27, 2022

Related U.S. Application Data

(60) Provisional application No. 63/054,950, filed on Jul. 22, 2020.

(51) Int. Cl.
G01C 21/34 (2006.01)
G01C 21/00 (2006.01)

(52) U.S. Cl.
CPC ..... *G01C 21/3446* (2013.01); *G01C 21/3484* (2013.01); *G01C 21/3837* (2020.08)

(58) Field of Classification Search
CPC ............ G01C 21/3446; G01C 21/3837; G01C 21/3484
See application file for complete search history.

(56) References Cited

U.S. PATENT DOCUMENTS

| 9,736,685 | B2 | 8/2017 | Cai et al. |
| 2014/0108361 | A1 | 4/2014 | Biswas et al. |
| 2015/0120600 | A1 | 4/2015 | Luwang et al. |

(Continued)

FOREIGN PATENT DOCUMENTS

| CN | 108882152 A | 11/2018 |
| JP | 6479289 B1 * | 3/2019 |

OTHER PUBLICATIONS

English translation of JP-6479289-B1.*

(Continued)

*Primary Examiner* — Anshul Sood
*Assistant Examiner* — Matthew Ho
(74) *Attorney, Agent, or Firm* — Alston & Bird LLP

(57) ABSTRACT

A method, apparatus, and computer program product are provided for anonymizing the trajectory of a vehicle. Methods may include: receiving a sequence of probe data points defining a trajectory; for a subset of the sequence of probe data points defining the trajectory beginning at an origin: updating a counter value at each probe data point, where the counter value is updated based, at least in part, on properties of a number of road links emanating from each junction through which the trajectory passed to reach a location associated with the respective probe data point; in response to the counter value satisfying a predetermined value after an update relative to a given probe data point, removing probe data points before the given probe data point in the sequence of probe data points to obtain origin-obscured probe data points; and creating a cropped trajectory including the origin-obscured probe data points.

20 Claims, 7 Drawing Sheets

(56) References Cited

U.S. PATENT DOCUMENTS

| | | |
|---|---|---|
| 2017/0358204 A1 | 12/2017 | Modica et al. |
| 2019/0272389 A1* | 9/2019 | Viente .................. G06V 20/582 |
| 2020/0018607 A1 | 1/2020 | Raghavendran |
| 2020/0019894 A1 | 1/2020 | Jin et al. |
| 2020/0021511 A1 | 1/2020 | Xu et al. |
| 2020/0112835 A1 | 4/2020 | Li et al. |
| 2022/0188660 A1 | 6/2022 | Schoenharl et al. |

OTHER PUBLICATIONS

Ward et al., *A parallel Algorithm for Anonymizing Large-scale Trajectory Data*, University of Missouri, ACM Trans. Data Sci., vol. 1, No. 1, Article 5, Published Jan. 2020.

Zhao et al., *A Privacy-preserving Trajectory Publication Method Based on Secure Start-points and End-points*, Anhui Normal University, China, Hindawi Mobile Information Systems, vol. 2020, Article ID 3429256 (12 pages) Published Apr. 21, 2020.

Extended European Search Report for European Application No. 21186333.7 dated Dec. 13, 2021, 8 pages.

Bamba et al., "Road Network-Aware Anonymization in Mobile Systems with Reciprocity Support", 2015 24th International Conference on Computer Communications and Networks (ICCCN), IEEE, (Aug. 3, 2015), 8 pages.

Sui et al., "ROAT: Road-Network-Based Anonymization of Trajectories", 2016 International IEEE Conferences on Ubiquitous Intelligence & Computing, Advanced and Trusted Computing, Scalable Computing and Communications, Cloud and Big Data Computing, Internet of People, and Smart World Congress, (Jul. 18, 2016), 6 pages.

Non-Final Office Action for U.S. Appl. No. 17/118,216 dated Oct. 7, 2022.

\* cited by examiner

1. T = {p0,p1,p2,...pt}
2. Current_index = 0
3. Total_count = 0
4. Threshold = random_integer_between (2,X)
5. While total_count < threshold:
    a. Current_index+=1
    b. Current_point = T[current_index]
    c. Current_segment = map_matcher(current_point)
    d. If current_segment is the exit of a junction:
        i. Total_count+ = accessibility_map[current_segment] – 1
6. T = T[current_index + 1,...]

FIG. 4

METHOD, APPARATUS, AND COMPUTER PROGRAM PRODUCT FOR ANONYMIZING TRAJECTORIES

CROSS-REFERENCE TO RELATED APPLICATIONS

This application claims priority to U.S. Provisional Application Ser. No. 63/054,950, Filed on Jul. 22, 2020, the contents of which are hereby incorporated by reference in their entirety.

TECHNOLOGICAL FIELD

An example embodiment of the present disclosure relates to anonymizing trajectories of mobile devices, and more particularly, to pruning or cropping of a beginning and an end of a trajectory between an origin and a destination to remove identifiable information from the trajectory.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to pruning or cropping of a beginning and an end of a trajectory between an origin and a destination to remove identifiable information from the trajectory. According to an example embodiment, an apparatus is provided including at least one processor and at least one memory including computer program code, the at least one memory and computer program code configured to, with the processor, cause the apparatus to at least: receive a sequence of probe data points defining a trajectory; for a subset of the sequence of probe data points defining the trajectory beginning at the origin: update a counter value at each probe data point, where the counter value is updated based, at least in part, on properties of a number of road links emanating from each junction through which the trajectory passed to reach a location associated with the respective probe data point; and in response to the counter value satisfying a predetermined value after an update relative to a given probe data point, remove probe data points before the given probe data point in the sequence of probe data points to obtain origin-obscured probe data points; and create a cropped trajectory including the origin-obscured probe data points.

According to some embodiments, the predetermined value includes a random number within a predefined range. The apparatus of some embodiments may be caused to provide the cropped trajectory to a location-based service provider. The properties of the number of road links emanating from each junction is identified based on an accessibility map of a road network through which the trajectory passes. The accessibility map may include information defining possible ways of entering and leaving junctions of the road networks factoring in properties of the map including an allowable direction of travel in each road link. The counter value may be updated based, at least in part, on a score for each junction through which the trajectory passed to reach the location associated with the respective probe data point, where the score is obtained from an accessibility map.

According to an example embodiment, the subset of the sequence of probe data points includes an origin sequence, where the apparatus is further caused to: receive an indication of a probe data point defining an end of the trajectory; and for a destination sequence of probe data points beginning with the probe data point defining the end of the trajectory: update a second counter value, where the second counter value is updated based, at least in part, on a number of road links emanating from each junction through which the trajectory passes as the trajectory is traced in reverse to reach a location associated with the respective probe data point along the trajectory; and in response the second counter value updated for a given probe data point of the ending sequence of probe data points satisfying a predetermined value, remove probe data points after the given probe data point in the ending sequence of probe data points from the origin-obscured probe data points to obtain origin-obscured and destination-obscured probe data points, where causing the apparatus to create a cropped trajectory includes causing the apparatus to create a cropped trajectory from the origin-obscured and destination-obscured probe data points. Causing the apparatus of some embodiments to create a cropped trajectory includes causing the apparatus to: remove any information from the cropped trajectory identifying an entrance to a junction at the beginning of the cropped trajectory; and remove any information from the cropped trajectory identifying an exit from a junction at the end of the cropped trajectory.

Embodiments provided herein include a computer program product having at least one non-transitory computer-readable storage medium having computer-executable program code portions stored therein, the computer-executable program code portions including program code instructions configured to: receive a sequence of probe data points defining a trajectory; for a subset of the sequence of probe data points defining the trajectory beginning at an origin: update a counter value at each probe data point, where the counter value is updated based, at least in part, on properties of a number of road links emanating from each junction through which the trajectory passed to reach a location associated with the respective probe data point; in response to the counter value satisfying a predetermined value after an update relative to a given probe data point, remove probe data points before the given probe data point in the sequence of probe data points to obtain origin-obscured probe data points; and create a cropped trajectory including the origin-obscured probe data points.

According to an example embodiment, the predetermined value includes a random number within a predefined range. Embodiments may include program code instructions to provide the cropped trajectory to a location-based service provider. The properties of the number of road links emanating from each junction may be identified based on an accessibility map of a road network through which the trajectory passes. The accessibility map may include information defining possible ways of entering and leaving junctions of the road networks factoring in properties of the map including an allowable direction of travel in each road link. The counter value may be updated based, at least in part, on a score for each junction through which the trajectory passed to reach the location associated with the respective probe data point, where the score is obtained from an accessibility map.

According to an example embodiment, the subset of the sequence of probe data points includes an origin sequence, where the computer program product further includes program code instructions to: receive an indication of a probe data point defining an end of the trajectory; for a destination sequence of the probe data points beginning with the probe data point defining the end of the trajectory: update a second counter value, where the second counter value is updated based, at least in part, on a number of road links emanating from each junction through which the trajectory passes as the trajectory is traced in reverse to reach a location associated with the respective probe data point along the trajectory; and in response to the second counter value updated for a given probe data point of the ending sequence of probe data points satisfying a predetermined value, remove probe data points after the given probe data point in the ending sequence of probe data points from the origin-obscured probe data points to obtain origin-obscured and destination-obscured probe data points, where the program code instructions to create a cropped trajectory includes program code instructions to create a cropped trajectory from the origin-obscured and destination-obscured probe data points. The program code instructions to create a cropped trajectory may further include program code instructions to: remove any information from the cropped trajectory identifying an entrance to a junction at the beginning of the cropped trajectory; and remove any information from the cropped trajectory identifying an exit from a junction at the end of the cropped trajectory.

Embodiments provided herein include a method including: receiving a sequence of probe data points defining a trajectory; for a subset of the sequence of probe data points defining the trajectory beginning at an origin: updating a counter value at each probe data point, where the counter value is updated based, at least in part, on properties of a number of road links emanating from each junction through which the trajectory passed to reach a location associated with the respective probe data point; in response to the counter value satisfying a predetermined value after an update relative to a given probe data point, removing probe data points before the given probe data point in the sequence of probe data points to obtain origin-obscured probe data points; and creating a cropped trajectory including the origin-obscured probe data points. The predetermined value may include a random number within a predefined range. Embodiments may include providing the cropped trajectory to a location-based service provider. The properties of the number of road links emanating from each junction may be identified based on an accessibility map of a road network through which the trajectory passes.

Embodiments provided herein include an apparatus including: means for receiving a sequence of probe data points defining a trajectory; for a subset of the sequence of probe data points defining the trajectory beginning at an origin: means for updating a counter value at each probe data point, where the counter value is updated based, at least in part, on properties of a number of road links emanating from each junction through which the trajectory passed to reach a location associated with the respective probe data point; in response to the counter value satisfying a predetermined value after an update relative to a given probe data point, means for removing probe data points before the given probe data point in the sequence of probe data points to obtain origin-obscured probe data points; and means for creating a cropped trajectory including the origin-obscured probe data points. The predetermined value may include a random number within a predefined range. Embodiments may include means for providing the cropped trajectory to a location-based service provider. The properties of the number of road links emanating from each junction may be identified based on an accessibility map of a road network through which the trajectory passes.

Embodiments provided herein include an apparatus having at least one processor and at least one memory including computer program code, the at least one memory and computer program code configured to, with the processor, cause the apparatus to at least: receive probe data associated with a vehicle, where the probe data includes probe data points, each probe data point including a location and a timestamp; determine a trajectory based on the probe data beginning at an origin; in response to a counter value failing to satisfy a predetermined value: advance to a next probe data point; associate the next probe data point to a map element; and in response to the map element corresponding to a junction, update the counter value based, at least in part, on a number of road links intersecting at the junction; in response to the counter value satisfying the predetermined value: modify the trajectory to begin with a probe data point associated with a map element corresponding to a junction having caused the counter to satisfy the predetermined value. The predetermined value may include a random number within a predefined range.

Embodiments may include causing the apparatus to remove from the trajectory any information identifying an entrance to a junction at a beginning of the modified trajectory. The apparatus of some embodiments is caused to: estimate a destination of the trajectory; identify a boundary around the estimated destination of the trajectory; and end the modified trajectory at alas probe data point received outside of the boundary. Causing the apparatus to provide the modified trajectory to a service provider may include causing the apparatus to: provide the modified trajectory to a service provider with a time delay from the time at which the probe data was received; and cease to provide the modified trajectory in response to determining that the vehicle has reached a location proximate the destination. The number of road links intersecting at each junction may be identified based on an accessibility map of a road network through which the trajectory passes. The accessibility map may include information defining possible ways of entering and leaving junctions of the road network factoring in properties of the map including an allowable direction of travel in each road link.

Embodiments provided herein include a computer program product including at least one non-transitory computer-readable storage medium having computer-executable program code portions stored therein. The computer-executable program code portions including program code instructions configured to: receive probe data associated with a vehicle, where the probe data includes probe data points, each probe data point including a location and a timestamp; determine a trajectory based on the probe data beginning at an origin; in response to a counter value failing to satisfy a predetermined value: advance to a next probe data point; associate the next probe data point to a map element; and in response to the map element corresponding to a junction, update the counter value based, at least in part, on a number of road links intersecting at the junction; in response to the counter value satisfying the predetermined value: modify the trajectory to begin with a probe data point associated with a map element corresponding to a junction having caused the counter to satisfy the predetermined value. The predetermined value may include a random number within a predefined range.

According to an example embodiment, the computer program product includes program code instructions to remove from the trajectory any information identifying an entrance to a junction at a beginning of the modified trajectory. Embodiments may include program code instructions to: estimate a destination of the trajectory; identify a boundary around the estimated destination of the trajectory; and end the modified trajectory at a last probe data point received outside of the boundary. The program code instructions to provide the modified trajectory to a service provider may include program code instructions to: provide the modified trajectory to a service provider with a time delay from the time at which the probe data was received; and cease to provide the modified trajectory in response to determining that the vehicle has reached a location proximate the destination. The number of road links intersecting at each junction may be identified based on an accessibility map of a road network through which the trajectory passes. The accessibility map may include information defining possible ways of entering and leaving junctions of the road networks factoring in properties of the map including an allowable direction of travel in each road link.

Embodiments provided herein include a method including: receiving probe data associated with a vehicle, where the probe data includes probe data points, each probe data point including a location and a timestamp; determine a trajectory based on the probe data beginning at an origin; in response to a counter value failing to satisfy a predetermined value: advancing to a next probe data point; associating the next probe data point to a map element; and in response to the map element corresponding to a junction, updating the counter value based, at least in part, on a number of road links intersecting at the junction; in response to the counter value satisfying the predetermined value: modifying the trajectory to begin with a probe data point associated with a map element corresponding to a junction having caused the counter to satisfy the predetermined value. The predetermined value may include a random number within a predefined range.

Methods may include removing from the trajectory any information identifying an entrance to a junction at a beginning of the modified trajectory. Methods may include: estimating a destination of the trajectory; identifying a boundary around the estimated destination of the trajectory; and ending the modified trajectory at a last probe data point received outside of the boundary. Providing the modified trajectory to a service provider may include: providing the modified trajectory to a service provider with a time delay from the time at which the probe data was received; and ceasing to provide the modified trajectory in response to determining that the vehicle has reached a location proximate the destination. The number of road links intersecting at each junction may be identified based on an accessibility map of a road network through which the trajectory passes.

Embodiments provided herein include an apparatus including: means for receiving probe data associated with a vehicle, where the probe data includes probe data points, each probe data point including a location and a timestamp; means for determine a trajectory based on the probe data beginning at an origin; in response to a counter value failing to satisfy a predetermined value: means for advancing to a next probe data point; means for associating the next probe data point to a map element; and in response to the map element corresponding to a junction, means for updating the counter value based, at least in part, on a number of road links intersecting at the junction; in response to the counter value satisfying the predetermined value: means for modifying the trajectory to begin with a probe data point associated with a map element corresponding to a junction having caused the counter to satisfy the predetermined value. The predetermined value may include a random number within a predefined range.

The apparatus of example embodiments may include means for removing from the trajectory any information identifying an entrance to a junction at a beginning of the modified trajectory. An example apparatus may include: means for estimating a destination of the trajectory; means for identifying a boundary around the estimated destination of the trajectory; and means for ending the modified trajectory at a last probe data point received outside of the boundary. The means for providing the modified trajectory to a service provider may include: means for providing the modified trajectory to a service provider with a time delay from the time at which the probe data was received; and means for ceasing to provide the modified trajectory in response to determining that the vehicle has reached a location proximate the destination. The number of road links intersecting at each junction may be identified based on an accessibility map of a road network through which the trajectory passes.

BRIEF DESCRIPTION OF THE DRAWINGS

Figure 1:
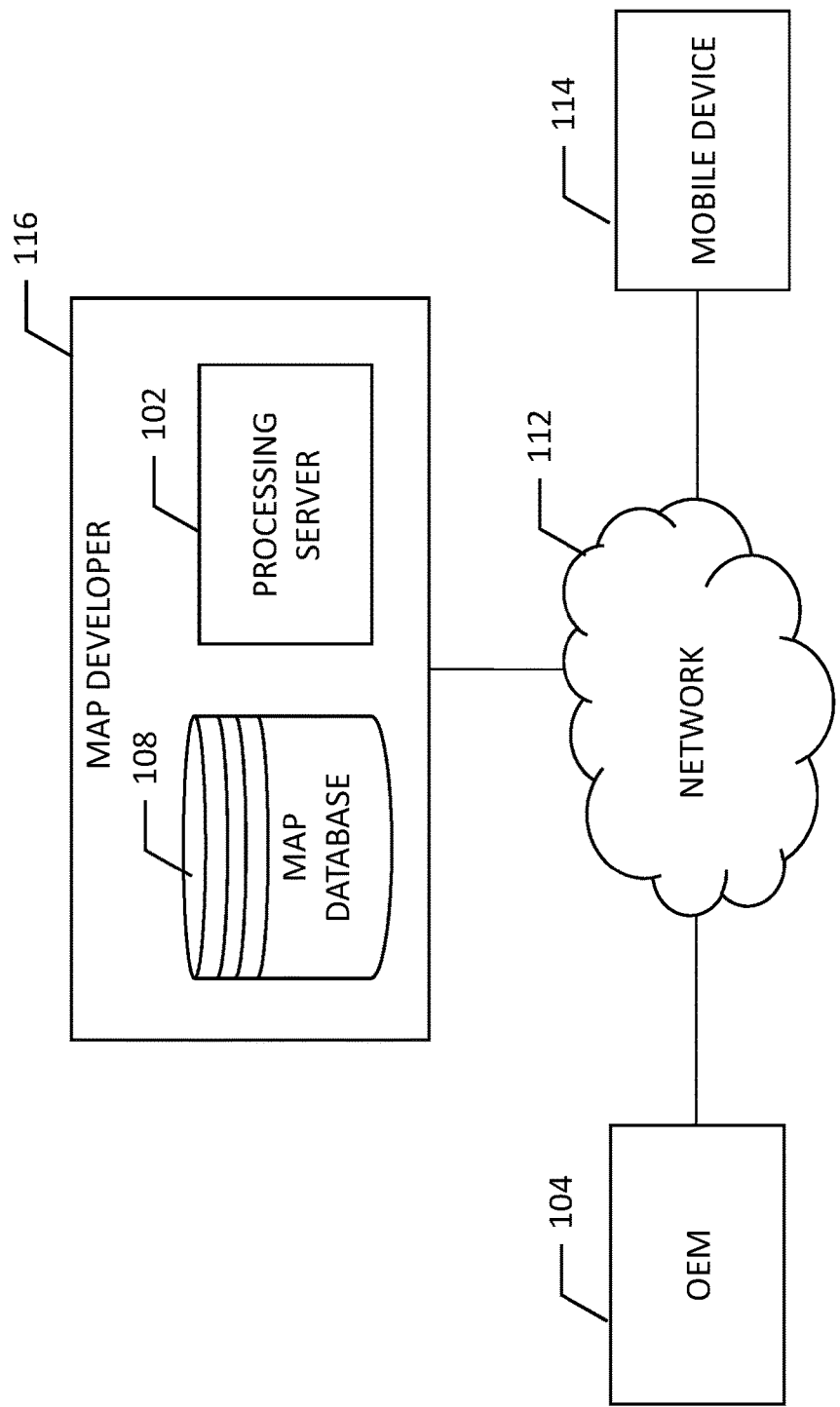
Figure 2:
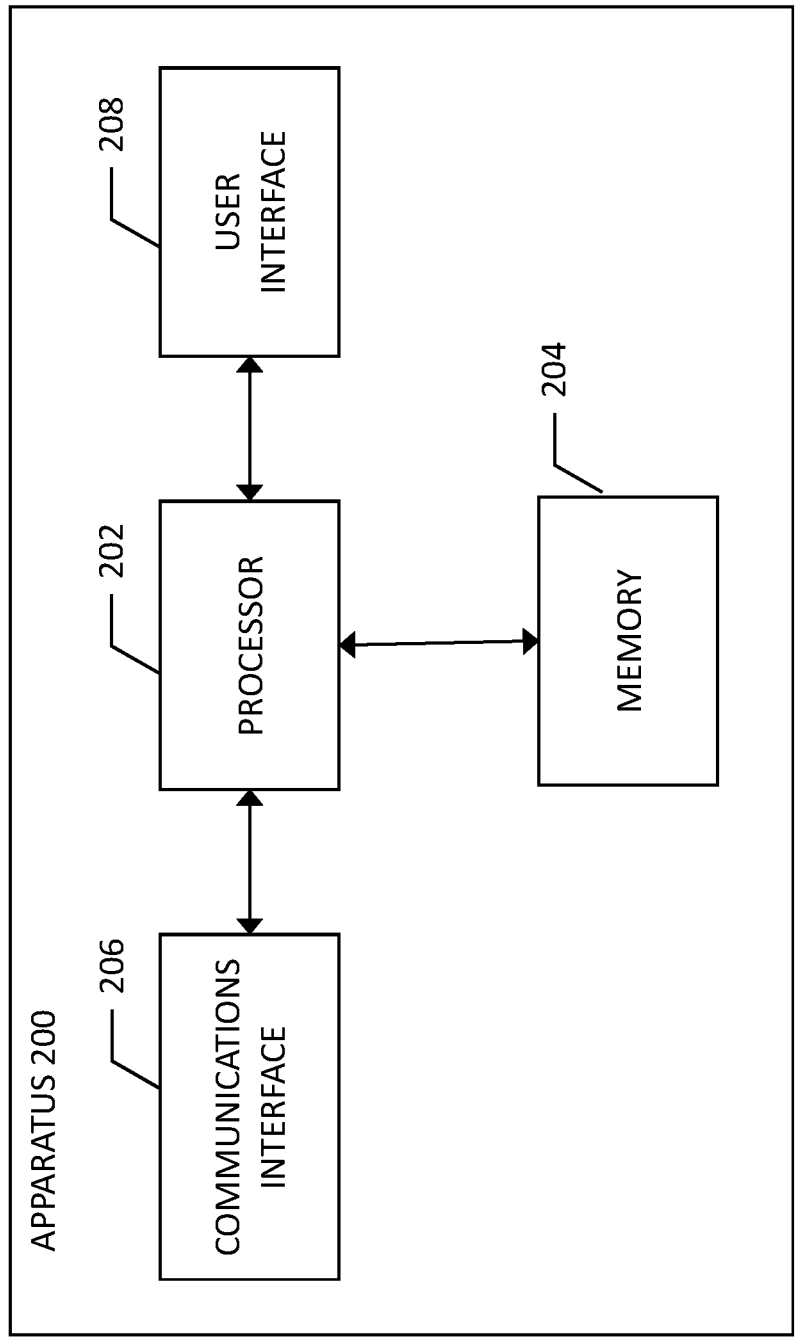
Figure 3:
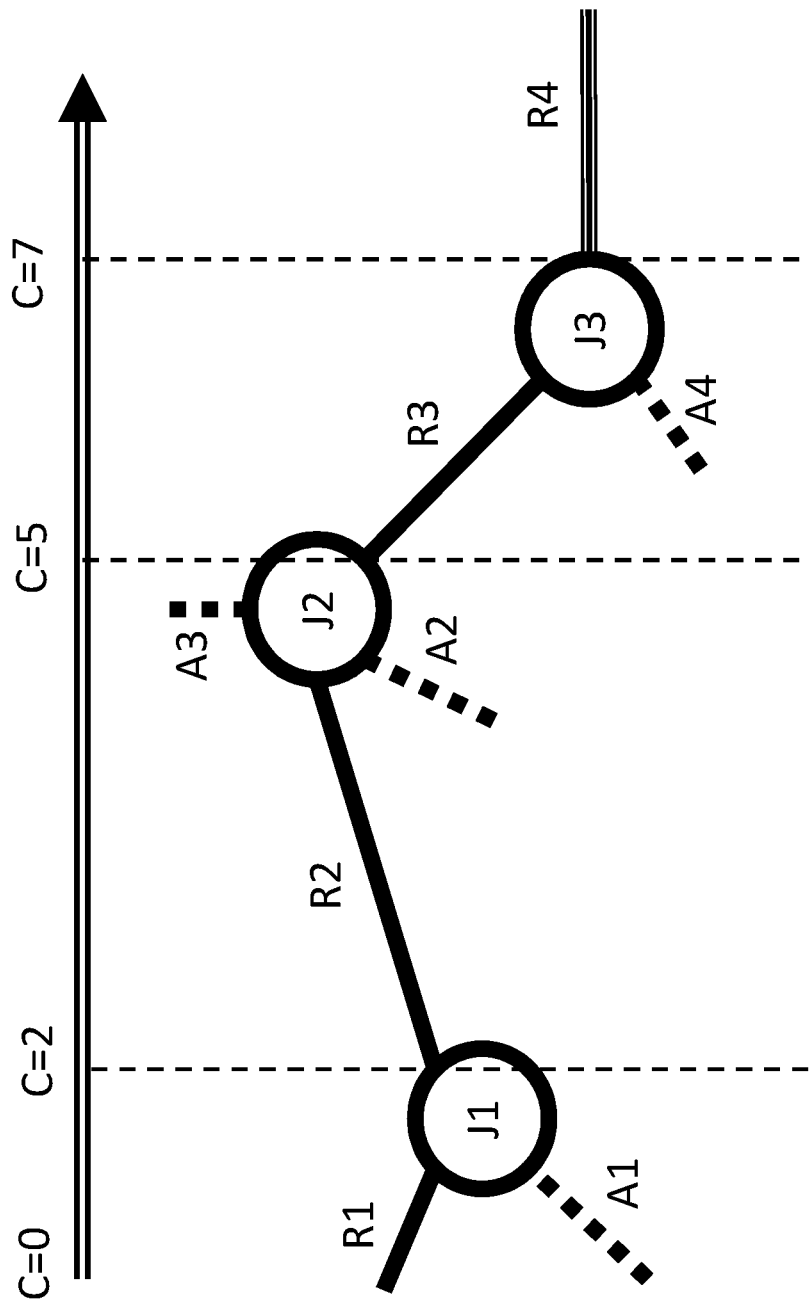
Figure 5:
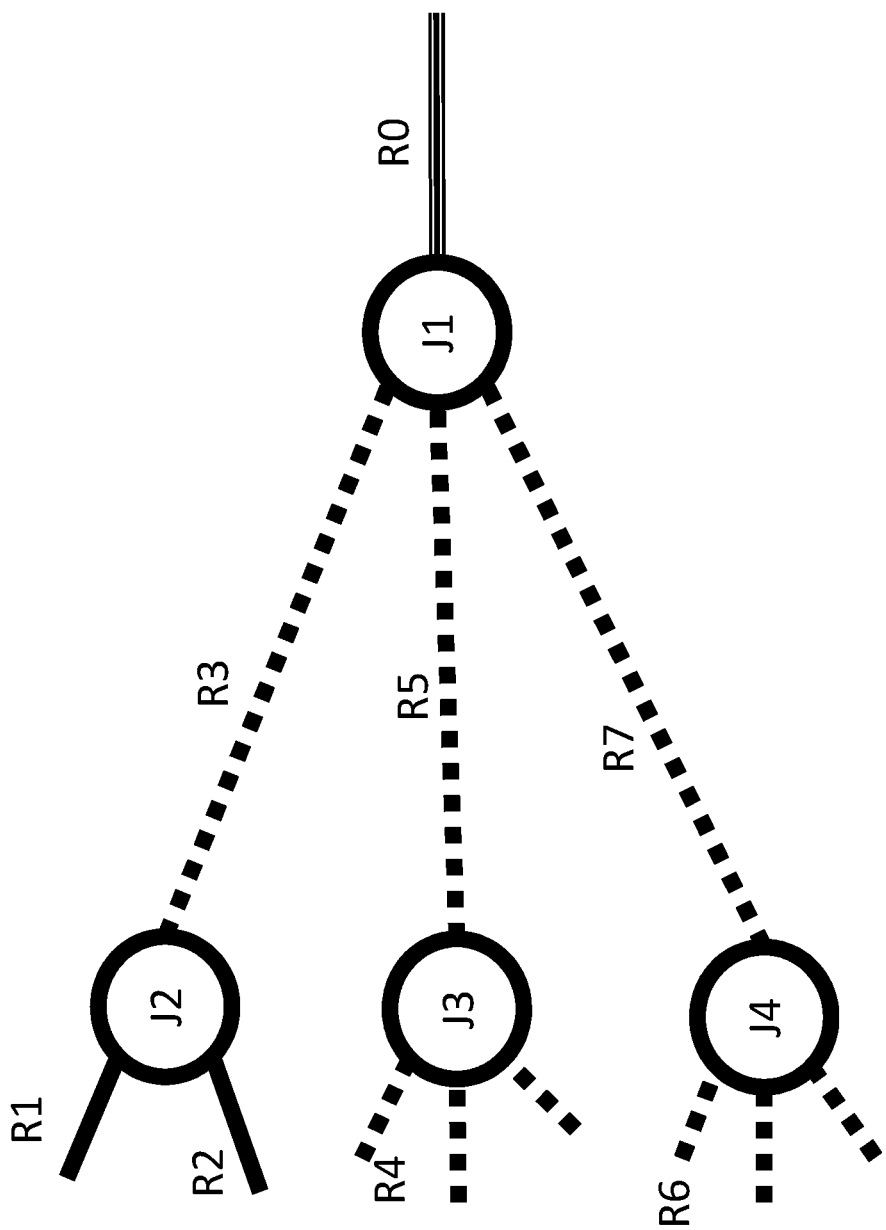
Figure 6:
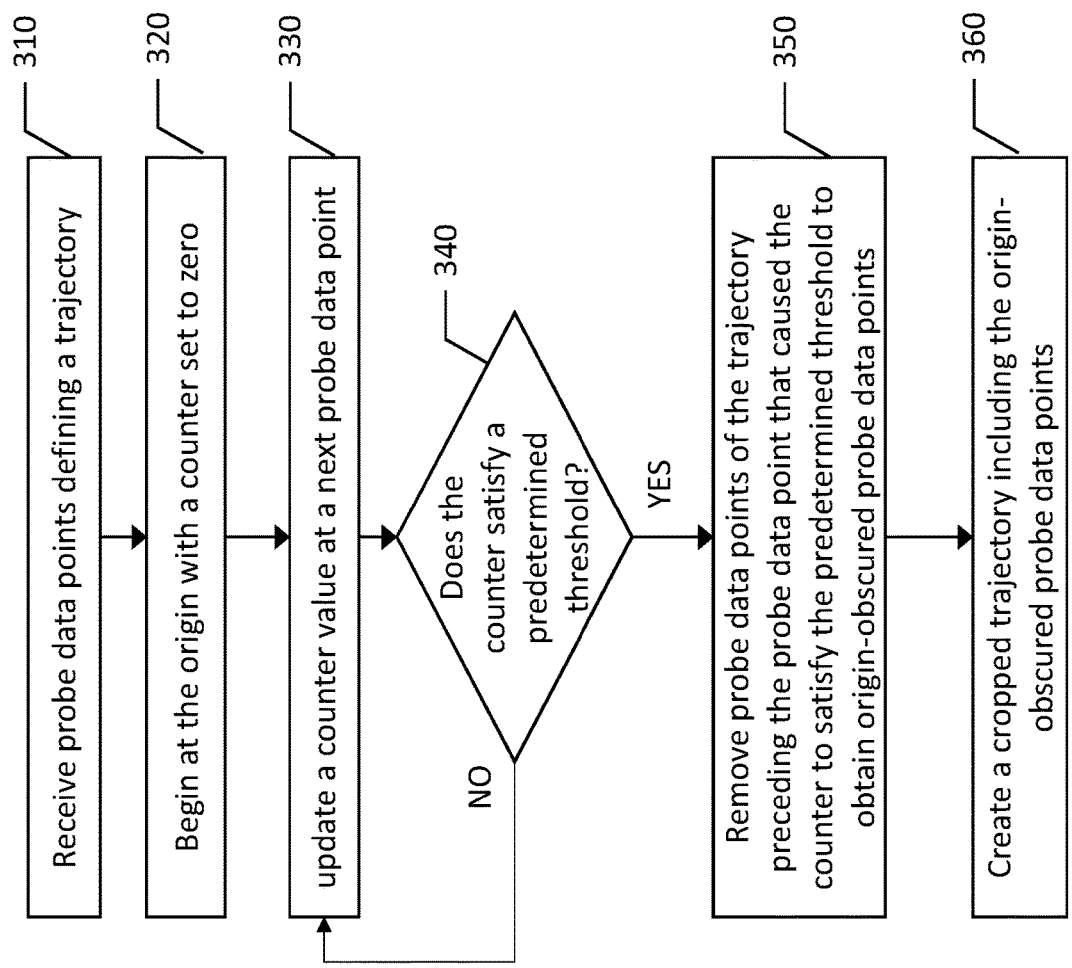
Figure 7:
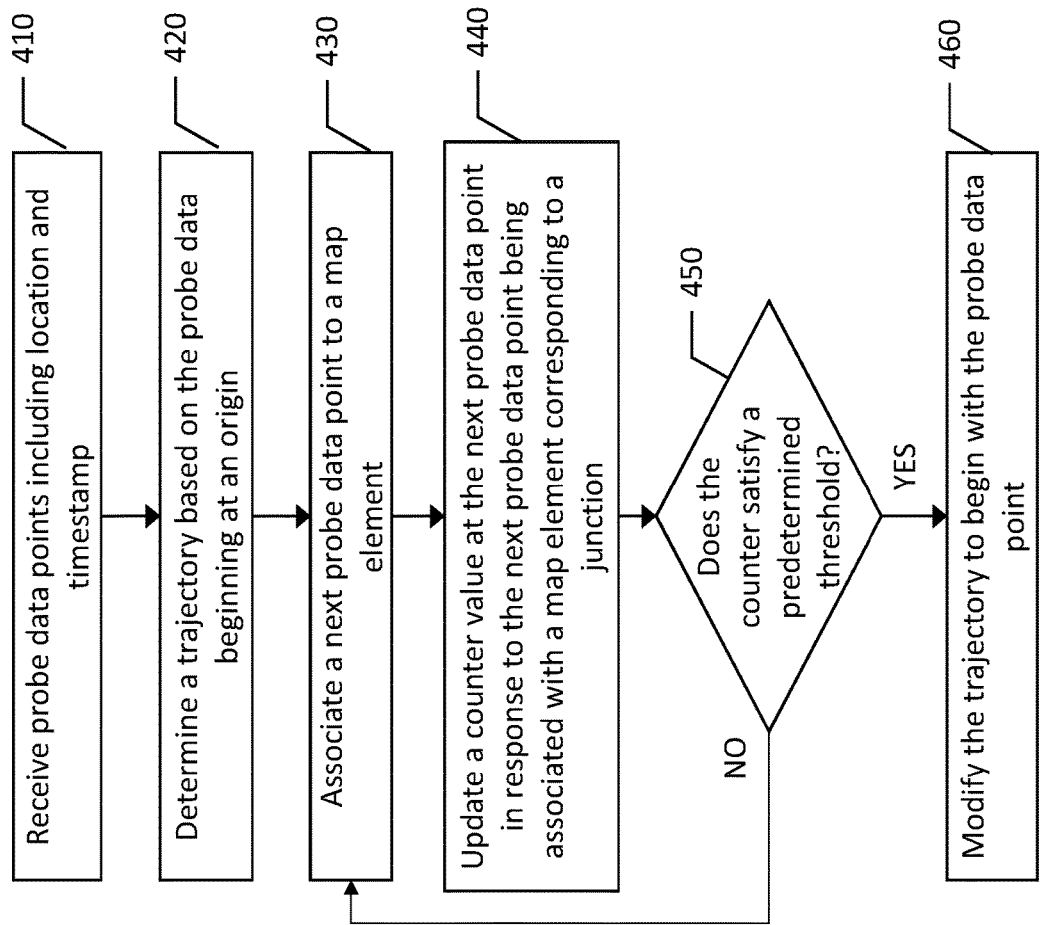

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present invention;

FIG. 3 is a diagram of a trajectory passing through junctions and increasing a counter according to an example embodiment of the present disclosure;

FIG. 4 illustrates an algorithm for determining where to crop a trajectory to maintain privacy according to an example embodiment of the present disclosure;

FIG. 5 is another diagram of a trajectory passing through junctions and increasing a counter according to an example embodiment of the present disclosure;

FIG. 6 is a flowchart of a method for determining where to crop a trajectory to maintain privacy according to an example embodiment of the present disclosure; and FIG. 7 is a flowchart of a method for anonymizing trajectories of mobile devices according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

A method, apparatus, and computer program product are provided herein in accordance with an example embodiment for anonymizing trajectories of mobile devices, and more particularly, to pruning or cropping of a beginning and an end of a trajectory between an origin and a destination to remove identifiable information from the trajectory. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services. While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult. Embodiments use only a portion of a trajectory of a user, where a trajectory is a path of a user between an origin and a destination, often identified by a number of time-stamped location points. Embodiments crop a portion at the beginning of the trajectory to mask the origin of the trajectory, and crop a portion at the end of the trajectory to mask the destination of the trajectory, thereby rendering it difficult to establish to whom the trajectory belongs while obtaining useful location-based trajectory information for use with location-based services.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. Further, data may be compiled relating to the existence of parking and parking space availability along different road segments of the map database, where a parking availability estimation may be generated in dependence of time of day, day of week, season of the year, special events, etc. Park-in and park-out events, may be established based on the assessment of whether a vehicle is performing a parking maneuver followed by a stop in movement of the probe (park-in) or a vehicle is performing a parking maneuver followed by continued movement of the probe (park-out), and the relative movement of vehicles performing park-in to performing park-out maneuvers can be used to estimate parking availability. Further, this data can be compiled for temporal clustering of epochs to estimate future parking availability. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for determining parking availability along road segments within regions of a map. Parking availability is described herein as whether or not parking spaces may be available (i.e., are not currently occupied). The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein provide privacy to users of location-based services by adding uncertainty regarding the origin and destination of trajectory data of the user. An origin and destination, separately or as a pair, can reveal sensitive locations regarding the user that generated the trajectory data, such as a home location and/or a work location, and identification of an origin, a destination, or both, may render the identity of the individual user relatively easy to obtain Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by cropping the trajectories through removal of the initial and final sections of the trajectory in order to introduce uncertainty about the actual origin and destination of the trajectory. If a trajectory includes additional sensitive points (e.g., stopping for a period of time at a location such as a hospital), the same approach can be applied to sub-trajectories to crop portions of a trajectory around a potentially sensitive location or stopping point within a trajectory. To maximize the utility of the data thereby improving the location-based services provided by the service provider, embodiments described herein identify a suitable location where to crop the trajectory based on an analysis of the trajectory.

While the cropping of trajectories can be performed using a constant temporal threshold (e.g., delete data until 2 minutes after start) or using a speed threshold (e.g., delete data until after the vehicle reaches a speed of 30 miles-per-hour), such embodiments can perform poorly in many circumstances. For example, a vehicle leaving a parking lot into a congested road, as a slow-moving vehicle would not get far from the parking lot within the temporal threshold. Leaving a parking lot into a high speed road would reach a speed threshold very quickly enabling identification of the origin of the trajectory. Leaving a farm in a rural area, where population density is much lower than in a city and therefore uncertainty about the origin of the trajectory would be much lower than desired (e.g., if the road segment where the trajectory starts leads to only a handful of residential units). Embodiments described herein solve these issues through a unique method of cropping trajectories.

Embodiments described herein introduce uncertainty in what is the origin and destination of a trajectory while avoiding unnecessary degradation of the data. This is achieved by dynamically choosing where to crop a trajectory based on the context in which the vehicle is located. Given that behavior of a vehicle is constrained by the road network, uncertainty will depend on the characteristics of the road network that the car is traversing. Algorithms described herein define uncertainty based on the possible alternative routes that could have been taken. Embodiments include the creation of an accessibility map that counts all possible ways of entering and leaving every junction and includes a score that may factor in context of the junction other than the number of road links emanating from the junction. For example, as will be detailed further below, a junction may have a higher score or count if the junction is in a heavily populated area as the mere indication that a trajectory starts at or near such a junction may not provide a substantial indication of to whom the trajectory belongs, Similarly, a junction may have several road links emanating from the junction; however, the junction may be located in a remote area and the likelihood of identifying an individual beginning a trajectory through that intersection increases substantially. The algorithms described herein consider properties of the map (e.g., the allowed direction of travel in each road segment) to identify a score for junctions such that the score can be used in embodiments described below to update a counter as a trajectory passes through the junction. The accessibility map may also be based on other types of information, such as the number of points-of-interest (POIs) proximate an origin or destination, the number of buildings in an area, the kind/category of buildings in an area, etc. and/or combinations thereof. The accessibility map may then be accessed by the algorithm when cropping trajectories.

A trajectory can be cropped in an on-line fashion or an off-line fashion. Postprocessing of trajectories either on a device or on a backend server (e.g., map services provider 116) is an example of off-line cropping, while an on-line cropping example may entail when a vehicle (or mobile device 114 thereof) decides when to crop trajectories as it proceeds along a path. Embodiments uniquely employ the context of the road network while cropping a trajectory thus ensuring privacy protection across trajectories while maximizing the utility of the trajectory data.

Embodiments described herein are generally directed at vehicles that transmit their behavior/location in the form of trajectory device to a server, such as a location-based service provider. In the on-line scenario, the vehicle transmits the data in real-time such that the vehicle must decide when to start transmitting information. In this scenario, the actual end of a trajectory cannot be known with certainty in advance, even in the case of guided navigation as a vehicle may stop at a different location from where the navigator is aiming. This renders cropping of the end of the trajectories more difficult. In the off-line scenario, the vehicle transmits the trajectory data after the trajectory is completed and the cropping of both the starting point (origin) and ending point (destination) is done before transmission by the vehicle or associated mobile device 114 or by the location-based service provider after receiving the trajectory data.

The process of calculating uncertainty may be maintained for both the beginning of a trajectory and the end of a trajectory. However, the techniques described herein work backward, in reverse from the end of a trajectory to crop the last portion of the trajectory before the destination. In a scenario in which the destination is known with certainty (e.g., off-line scenario), the application of the process described herein to the end of the trajectory is straight forward. In both scenarios, the algorithm understands the actual origin of the trajectory such that the algorithm begins from there and processes sequentially all points of the trajectory. In the on-line scenario, these points would arrive at the server in real-time as the vehicle's sensors report movement of the vehicle, while in the off-line scenario all points of the trajectory are saved in memory and can be accessed synchronously.

According to an example embodiment described herein, the algorithm begins at the actual origin of the trajectory and iterates on the successive points in order. When a junction is encountered, a counter is updated based on properties of the junction. The accessibility map is used to determine the properties of the junction and to identify the contribution that junction makes toward anonymizing a trajectory. That contribution is provided in a score with which the counter is updated. One such property of a junction is the number of alternative routes emanating from the junction. A more basic approach to incrementing the counter would be to update the counter based on the number of road links emanating from the junction without context. However, including context, such as population density, POI density, etc., can be used to more accurately determine where a trajectory should be cropped in order to anonymize the trajectory. Once the counter value is larger than a predetermined threshold value, the algorithm stops and crops the trajectory data up to that point of the trajectory or begins transmission of the trajectory in an on-line scenario. All data that lies in the junction (e.g., the road link leading to the junction that the vehicle arrived at the junction on) may be cropped from the trajectory data.

FIG. 3 illustrates an example embodiment of the cropping algorithm of an example trajectory. In the illustrated example embodiment, the score for each junction is based on the number of road links emanating from the junction, with the road link used to enter the junction on the trajectory subtracted from that number. As noted above, this is a basic example of an implementation of the embodiments described herein. The trajectory starts along road link R1 that arrives at junction J1 and exits along road link R2. Here, Junction J1 is evaluated and the counter C is updated and incremented by the number of exits in junction J1, so the counter is incremented to a value of two (C=2) including road link R2 and alternate road link A1, but not including road link R1 as that was the road link along which the trajectory entered the junction. The trajectory continues along road link R2 to junction J2, where it exits J2 along road link R3. Counter C is incremented by the number of exits in junction J2 or three (road link R3 and alternate segments A2 and A3) such that the counter reaches a total of five (C=5) upon the vehicle exiting junction J2 along road link R3. Five is less than a threshold value of six, such that the trajectory through road link R3 remains a portion that will be cropped in an off-line scenario, or the vehicle may not have begun transmitting a trajectory in an on-line scenario. The vehicle reaches junction J3 along road link R3 and exits the junction along road link R4. As there are two exits available from junction J3 (road link R4 and alternate road link A4) when arriving along road link R3, the counter is incremented by two to reach a value of seven (C=7) such that the threshold of six is reached and exceeded. Thus, the trajectory suitable for the location-based service provider begins at road link R4. The portion of the trajectory including road links R1, R2, and R3 is cropped by deletion or removal of the portion of the trajectory in an off-line scenario or beginning to transmit the trajectory of the vehicle upon beginning to drive along road link R4 in an on-line scenario.

FIG. 4 illustrates an algorithm of an example embodiment for cropping a trajectory. A trajectory includes a plurality of probe data points, where the probe data points include at least location information and timestamp information. The probe data points may be map-matched to road links of a map to generate a trajectory including a plurality of sequential road links in the map. Optionally, as in the algorithm described below, the trajectory may not be identified as a sequence of road links and the probe data points may individually be map-matched to road links as the algorithm loops through the analysis routine.

As shown in FIG. 4, given a trajectory T={p0, p1, p2, . . . pt}, where pi is a probe data point, e.g., spatio-temporal coordinate including a location and a timestamp. An index of the probe points "current_index" begins with a count of zero at step 2. The total count also begins at zero at step 3. The threshold is a number greater than two, but less than some predetermined maximum. The threshold may be determined at random from among a range of values to reduce the likelihood that a trajectory could be reverse-mapped to identify an origin or a destination as described further below.

The loop routine begins at step 5 and is performed until the total_count satisfies the threshold. At step 5.a., the current index is incremented by one as the loop routine "crawls" along the trajectory sequentially to each probe data point. The current_point is set equal to the probe data point corresponding to the current index value (e.g., if current index is 5, the probe data point p5 is the current_point). The current_segment is a road link map-matched to the current_point. The road link map-matched to the current point is the road link along which the vehicle is determined to be or have been at the time the probe data point was generated. If the map-matched current_segment is the exit of a junction (otherwise known as an intersection of three or more road links), the total_count is incremented by a score, such as the number of road links that intersect at the junction, minus one to account for the road link along which the vehicle entered the junction. As noted above, the score for a junction may be more complex and include additional factors, such as population density, POI density, or other properties of the accessibility map. The loop continues until the total_count satisfies the threshold. Once the total_count satisfies the threshold, the trajectory T is set equal to the trajectory starting with the current index or the next probe data point after the threshold was satisfied. This "crops" the probe data points from the trajectory below which the threshold was not satisfied.

While the above-described loop routine relies on map-matching a probe data point to a road link, map-matching may not be necessary. As map-matching can be processing intensive and be affected by a map version, embodiments described herein may associate a probe data point to a map object or map element. A map element may include a geofence around an area such as a junction or a road link, or a map element may be a road link. Map-matching may require more rigid association of a probe data point to a road link, while associating a probe data point to a map element may be less rigid and may provide more flexibility between differing map versions or road links that do not identically align between maps. Further, associating a probe data point to a map element may require less processing capacity than map-matching.

A higher threshold value results in a higher uncertainty about the actual origin of the trajectory as it increases the number of alternative paths that the trajectory could have taken. The same algorithm can be applied to the destination end of the trajectory by starting from the end of the trajectory and processing the points in reverse order.

An adversary that aims to infer the actual origin of a cropped trajectory could narrow down the possible alternative paths by reversing the cropping algorithm. To do so, the adversary needs to know the properties of the road network (e.g., the number of road links emanating from or exiting a junction and the threshold used in cropping). FIG. 5 illustrates a situation in which an adversary could narrow down the origin of a cropped trajectory to only two road links. According to the illustrated embodiment, the threshold used has a value of three. Were the original trajectory to start in either road link R4 or road link R6, the cropped trajectory would start in road link R5 or road link R7, respectively, as junction J3 and junction J4 have a number of exits equal to the threshold. For this reason, an adversary can conclude that the origin of the trajectory must be road link R1 or road link R2.

Given that the properties of a road network are public information, an adversary must not know the threshold chosen by the algorithm. Embodiments described herein employ a threshold that is randomly selected from a range of values. This range may be narrow while being able to thwart adversaries from identifying origin road links.

The accessibility map data may include map data contained in map database 108 of the map developer 116 or a map service provider may include links or segments, where each roadway in a mapped network comprises a series of interconnected links. Each link is associated with attributes about the geographical segment that they represent. A link may include link geometry data that is a list of coordinates that represent the geographical entity. Links may also include a total length of the geographic segment they represent and travel heading/bearing along the link. Further, information about the area around a road link or junction may be included in the accessibility map, such as the population density, POI density, etc.

Road links represented by links can be used in calculating a route or recording a route as traveled. Nodes are end points corresponding to the respective links or segments of the road. Road link data records and node data records may be stored, for example, in map database 108, and may represent a road network. Road links and nodes can be associated with attributes such as geographic coordinates, street names, address ranges, speed limits, turn restrictions at intersections, and other navigation related attributes, as well as points of interest (POIs), such as traffic controls (e.g., stoplights, stop signs, crossings, etc.), fuel stations, hotels, restaurants, museums, stadiums, offices, repair shops, buildings, stores, parks, etc. The map database 108 can include data about places, such as cities, towns, or other communities, and other geographic features, such as bodies of water, mountain ranges, etc. Such place or feature data can be part of POI data or can be associated with POIs or POI data records.

The score of a junction may be based on the number of roads emanating from the junction, and may also include a weighting factor or bonus/penalty for context of the junction. For example, a junction may include four road links emanating from the junction. If the junction is in a heavily populated area, the junction is less likely to divulge information about an individual, such that the score for the junction may be based on the number of road links emanating from the junction (e.g., four subtracting one for the path along which the junction was entered) and a bonus weight or weight factor may be used to increase the score of the junction. A junction in what is deemed a heavily populated area may be multiplied by a factor, such as 1.5 to increase the score of that junction, or the junction may be afforded a bonus, such as two, as the junction is less likely to divulge private information, and contributes more to the counter to reach the threshold beyond which the trajectory may be used without being traceable to a unique individual.

Similarly, the score of a junction may include a penalty when the junction is in a relatively remote location. A junction having four road links emanating from the junction in a remote area may be weighted with a factor of 0.75, for example, to compensate for the junction not providing substantial anonymity. Similarly, a penalty could be assessed to the junction, such that the number of road links emanating from the junction may be reduced by two.

While junctions have been described above as having population-based weighting factors, other context can also be implemented. For example, a junction in a road may be a four-way intersection with four roads emanating from the junction. However, two of those roads may be private roads, dead end roads, or roads that otherwise discourage travel (e.g., unpaved, narrow, low clearance, etc.). The context of the junction may reflect this and may reduce the score of the junction as there is typically only one path through the intersection, avoiding the less-traveled roads that intersect there. Thus, the penalty to the score could be substantial and the junction could have a net score as little as zero since it may provide no anonymity. Further, points-of-interest may influence the penalty or bonus afforded to a junction, such as when the junction is proximate a hospital or rehabilitation center, for example, which may be a particularly sensitive area for a user such that junctions proximate these types of POIs may be further penalized.

Beyond population-based weighting factors, junctions may have time-based weighting factors and/or time-based and POI-type-based weighting factors. For example, a junction proximate an office complex may be busy during the day on weekdays, but relatively empty on weekends or at night. This type of junction may therefore have a bonus-weighting during the day on weekdays as it can provide a greater degree of anonymity, while it may have a penalty-weighting at night or on weekends. Similarly, a stadium may have adjacent neighborhoods that have relatively low traffic outside of events at the stadium. A scheduled event at the stadium may weight junctions around the stadium differently than outside of scheduled events. These time epochs may influence the weighting of a junction in identifying the degree to which the junction provides anonymity. Optionally, a live traffic status may be used to weight a junction whereby the junction provides greater anonymity during times of heavy traffic while the junction provides lesser anonymity during times of low traffic.

While example embodiments above describe the cropping of a single trajectory, example embodiments may be implemented on trajectories that are segmented. For example, in an embodiment in which a trajectory is segmented into four trajectory portions, the first trajectory portion includes the origin, and the fourth trajectory portion includes the destination. The second and third trajectory portions are sufficiently anonymized as they do not point to either an origin or a destination. As such, the cropping process may be implemented based on only the origin and destination. For example, the first trajectory portion may be cropped based on analysis of the trajectory starting with the origin. Similarly, the fourth trajectory portion may be cropped based on analysis of the trajectory starting with the destination and working backwards. These trajectory portions combine to form a single trajectory.

FIGS. 6 and 7 illustrate a flowcharts depicting methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method of anonymizing trajectories of mobile devices, and more particularly, to pruning or cropping of a beginning and an end of a trajectory between an origin and a destination to remove identifiable information from the trajectory. Probe data points defining a trajectory are received at 310. The probe data points may be received from a probe apparatus associated with a vehicle and including a location and timestamp. For a subset of probe data points of the sequence of probe data points defining the trajectory, begin at the origin with a counter set to zero at 320. Moving to a next probe data point, the counter value is updated at 330 based, at least in part, on the number of road links emanating from each junction through which the trajectory passed to reach a location associated with the respective probe data point. At 340 it the counter is checked to see if the counter satisfies a predetermined threshold. The predetermined threshold may be a random value between 2 and an upper limit. If the counter does not satisfy the threshold, the counter value is updated at the next probe data point at 330. If the counter satisfies the threshold at 340, probe data points from the trajectory preceding the probe data point that caused the counter to satisfy the predetermined threshold are removed to obtain origin-obscured probe data points at 350. A cropped trajectory is created at 360 including only the origin-obscured probe data points.

FIG. 7 illustrates another method of anonymizing trajectories of mobile devices, and more particularly, to pruning or cropping of a beginning and an end of a trajectory between an origin and a destination to remove identifiable information from the trajectory. Probe data points are received at 410 that include a location and timestamp. A trajectory is determined at 420 beginning at an origin and based on the probe data. A next probe data point is map-matched to a road link at 430. A counter value is updated at 440 at the next probe data point in response to the next probe data point being map-matched to a road link exiting a junction. At 450, the counter value is checked to determine if it satisfies a predetermined threshold. If the counter value does not satisfy the predetermined threshold, a next probe data point is map-matched at 430. If the threshold is satisfied by the counter value, the trajectory is modified to being with the probe data point that resulted in the counter value satisfying the threshold at 460.

In an example embodiment, an apparatus for performing the methods of FIGS. 6 and 7 above may comprise a processor (e.g., the processor 202) configured to perform some or each of the operations (310-360 and 410-460) described above. The processor may, for example, be configured to perform the operations (310-360 and 410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-360 and 410-460 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the at least one processor, cause the apparatus to at least:
   receive probe data associated with a vehicle, wherein the probe data comprises probe data points, each probe data point including a location and a timestamp derived from one or more sensors of the vehicle;
   determine a trajectory based on the probe data beginning at an origin;
   in response to a counter value failing to satisfy a predetermined value:
      advance to a next probe data point;
      associate the next probe data point to a map element;
      in response to the map element corresponding to a junction of a map database, update the counter value based, at least in part, on a number of road links intersecting at the junction;
   in response to the counter value satisfying the predetermined value:
      modify the trajectory to generate a modified trajectory beginning with a probe data point associated with the map element corresponding to a junction having caused the counter to satisfy the predetermined value;
      transmit the modified trajectory to a location-based service provider for provision of location-based services based, at least in part, on the modified trajectory.

2. The apparatus of claim 1, wherein the predetermined value comprises a random number within a predefined range.

3. The apparatus of claim 1, further comprising causing the apparatus to remove from the trajectory any information identifying an entrance to a junction at a beginning of the modified trajectory.

4. The apparatus of claim 1, wherein the apparatus is further caused to:
   estimate a destination of the trajectory;
   identify a boundary around the estimated destination of the trajectory; and
   end the modified trajectory at a last probe data point received outside of the boundary.

5. The apparatus of claim 1, wherein causing the apparatus is further caused
   provide the modified trajectory to the service provider with a time delay from the time at which the probe data was received; and
   cease to provide the modified trajectory in response to determining that the vehicle has reached a location within a predetermined distance of the destination.

6. The apparatus of claim 1, wherein the number of road links intersecting at each junction is identified based on an accessibility map of a road network through which the trajectory passes.

7. The apparatus of claim 6, wherein the accessibility map comprises information defining possible ways of entering and leaving junctions of the road network factoring in properties of the map including an allowable direction of travel in each road link.

8. A computer program product comprising at least one non-transitory computer-readable storage medium having computer-executable program code portions stored therein, the computer-executable program code portions comprising program code instructions configured to:
   receive probe data associated with a vehicle, wherein the probe data comprises probe data points, each probe data point including a location and a timestamp derived from one or more sensors of the vehicle;
   determine a trajectory based on the probe data beginning at an origin;
   in response to a counter value failing to satisfy a predetermined value:
      advance to a next probe data point;
      associate the next probe data point to a map element;
      in response to the map element corresponding to a junction of a map database, update the counter value based, at least in part, on a number of road links intersecting at the junction;

in response to the counter value satisfying the predetermined value:
modify the trajectory to generate a modified trajectory beginning with a probe data point associated with a map element corresponding to a junction having caused the counter to satisfy the predetermined value;
transmit the modified trajectory to a location-based service provider for provision of location-based services based, at least in part, on the modified trajectory.

9. The computer program product of claim 8, wherein the predetermined value comprises a random number within a predefined range.

10. The computer program product of claim 8, further comprising program code instructions to remove from the trajectory any information identifying an entrance to a junction at a beginning of the modified trajectory.

11. The computer program product of claim 8, further comprising program code instructions to:
estimate a destination of the trajectory;
identify a boundary around the estimated destination of the trajectory; and
end the modified trajectory at a last probe data point received outside of the boundary.

12. The computer program product of claim 8, further comprising program code instructions to:
provide the modified trajectory to the service provider with a time delay from the time at which the probe data was received; and
cease to provide the modified trajectory in response to determining that the vehicle has reached a location within a predetermined distance of the destination.

13. The computer program product of claim 8, wherein the number of road links intersecting at each junction is identified based on an accessibility map of a road network through which the trajectory passes.

14. The computer program product of claim 13, wherein the accessibility map comprises information defining possible ways of entering and leaving junctions of the road network factoring in properties of the map including an allowable direction of travel in each road link.

15. A method comprising:
receiving probe data associated with a vehicle, wherein the probe data comprises probe data points, each probe data point including a location and a timestamp derived from one or more sensors of the vehicle;
determining a trajectory based on the probe data beginning at an origin;
in response to a counter value failing to satisfy a predetermined value:
advancing to a next probe data point;
associating the next probe data point to a map element;
in response to the map element corresponding to a junction of a map database, updating the counter value based, at least in part, on a number of road links intersecting at the junction;
in response to the counter value satisfying the predetermined value:
modifying the trajectory to generate a modified trajectory beginning with a probe data point associated with a map element corresponding to a junction having caused the counter to satisfy the predetermined value;
transmitting the modified trajectory to a location-based service provider for providing location-based services based, at least in part, on the modified trajectory.

16. The method of claim 15, wherein the predetermined value comprises a random number within a predefined range.

17. The method of claim 15, further comprising removing from the trajectory any information identifying an entrance to a junction at a beginning of the modified trajectory.

18. The method of claim 15, further comprising:
estimating a destination of the trajectory;
identifying a boundary around the estimated destination of the trajectory; and
ending the modified trajectory at a last probe data point received outside of the boundary.

19. The method of claim 15, further comprising:
providing the modified trajectory to the service provider with a time delay from the time at which the probe data was received; and
ceasing to provide the modified trajectory in response to determining that the vehicle has reached a location within a predetermined distance of the destination.

20. The method of claim 15, wherein the number of road links intersecting at each junction is identified based on an accessibility map of a road network through which the trajectory passes.

* * * * *

UNITED STATES PATENT AND TRADEMARK OFFICE
CERTIFICATE OF CORRECTION

PATENT NO. : 11,703,337 B2
APPLICATION NO. : 17/118272
DATED : July 18, 2023
INVENTOR(S) : Stefano Bennati et al.

It is certified that error appears in the above-identified patent and that said Letters Patent is hereby corrected as shown below:

On the Title Page

In Column 1, item (72), under Inventors, Line 1, delete "(SZ);" and insert -- (CH); --, therefor.

In Column 1, item (72), under Inventors, Line 2, delete "(SZ);" and insert -- (CH); --, therefor.

In the Claims

In Column 22, Line 32, Claim 5, delete "caused" and insert -- caused: --, therefor.

Signed and Sealed this
Thirtieth Day of January, 2024

Katherine Kelly Vidal
*Director of the United States Patent and Trademark Office*